(12) United States Patent
Fujii et al.

(10) Patent No.: US 6,294,753 B1
(45) Date of Patent: Sep. 25, 2001

(54) RESISTANCE WELDING MACHINE CONTROL METHOD

(75) Inventors: Koji Fujii, Osaka; Yasuhiro Gotou; Makoto Ryudo, both of Kawanishi; Mikiji Suzuki, Okazaki, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/422,055

(22) Filed: Oct. 21, 1999

(30) Foreign Application Priority Data

Oct. 26, 1998 (JP) .................................................. 10-303499

(51) Int. Cl.⁷ .................................................. B23K 11/24
(52) U.S. Cl. .......................................... 219/110; 219/86.41
(58) Field of Search ..................................... 219/110, 109, 219/86.41

(56) References Cited

U.S. PATENT DOCUMENTS 5,892,197 * 4/1999 Goto et al. ............................ 219/110

6,057,523 * 5/2000 Fujii et al. ............................ 219/110

FOREIGN PATENT DOCUMENTS

| 59-40551 | 12/1981 | (JP) . |
| 57-127584 | 8/1982 | (JP) . |
| 7-16791 | 6/1992 | (JP) . |
| 09-216072 | 8/1997 | (JP) . |

* cited by examiner

*Primary Examiner*—Clifford C. Shaw
(74) *Attorney, Agent, or Firm*—Stevens, Davis, Miller & Mosher, LLP

(57) ABSTRACT

A resistor welding machine control method for calculating a temperature distribution at a portion to be welded by using changes in welding current and voltage across two welding electrodes during welding and information on sheet combination sequence at a spot-welding position, and for controlling at least the welding current or pressure applied to the electrodes by using the calculated temperature distribution. The present invention can thus provide a resistor welding machine control method capable of controlling welding quality accurately.

Spot-welding position information, wear comparison information and the like are available as other information.

14 Claims, 7 Drawing Sheets

FIG. 3
(a)
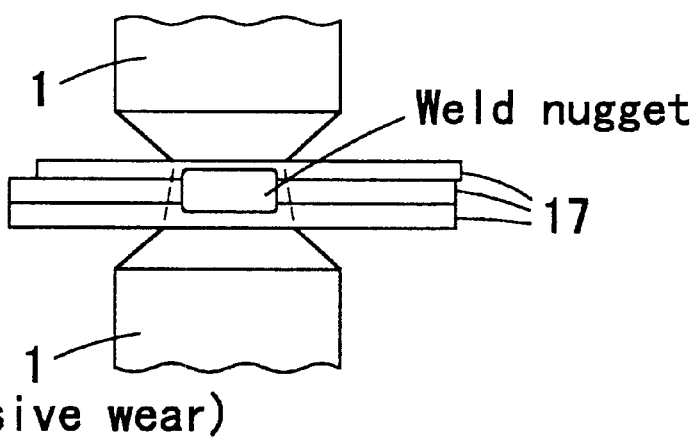
(Excessive wear)
(b)
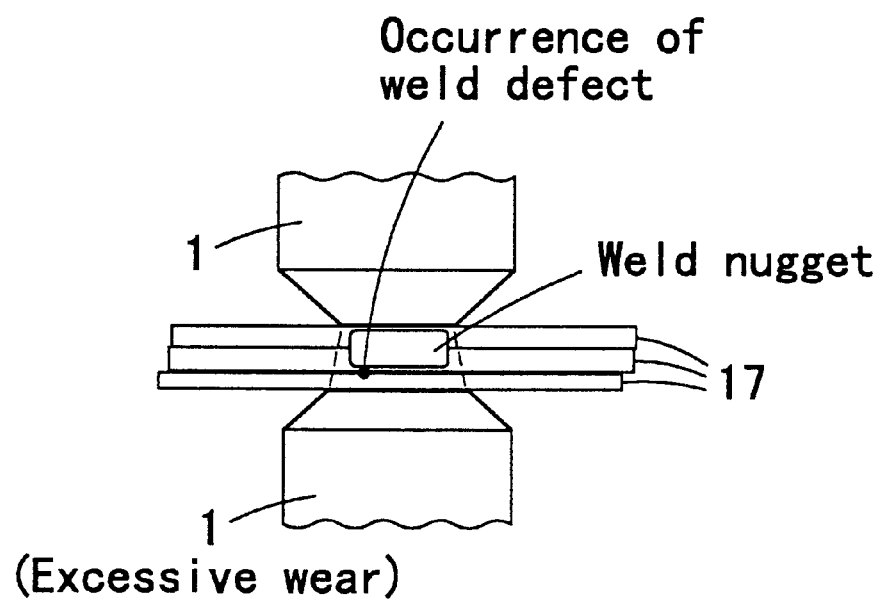
(Excessive wear)

FIG. 5
(a)
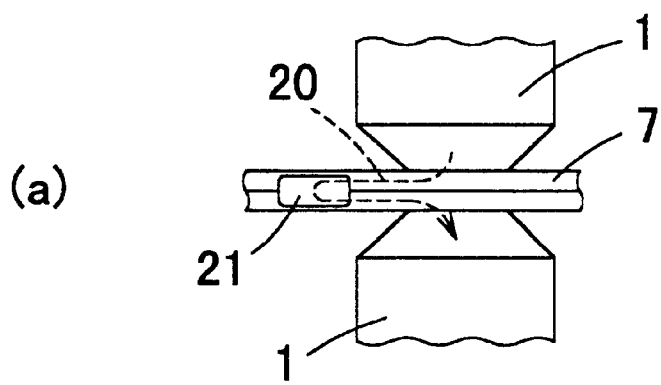
(b)
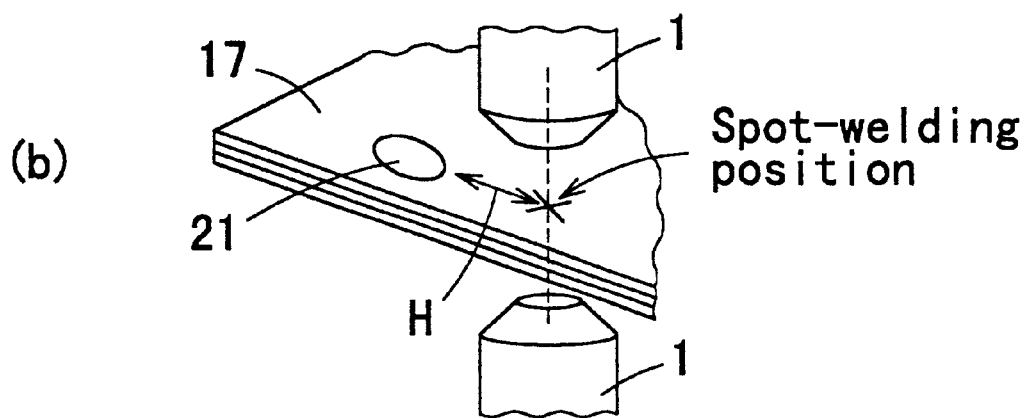

RESISTANCE WELDING MACHINE CONTROL METHOD

BACKGROUND OF THE INVENTION

1. Field of the Invention

The present invention relates to a method of controlling a resistance welding machine used for spot welding, for example.

2. Prior Art

Resistance welding, such as spot welding, has been used for a variety of products formed of steel sheets. However, weld defects during resistance welding tend to increase these days. In other words, conventionally, workpieces were generally formed of mild steel sheets. Therefore, improper welding occurred less frequently. By controlling welding conditions constant, it was possible to maintain the quality of welding relatively stably. However, galvanized steel sheets and high-tensile steel sheets have begun to be used abundantly instead of mild steel sheets, and weld defects have occurred more frequently.

Accordingly, the advent of a method capable of accurately controlling the quality of welding has been waited for.

To cope with this problem, a variety of welding control methods have been developed. For example, one of the methods developed up to this time is a method wherein the resistance across the electrode tips is obtained from welding current and welding voltage, and the welding current is controlled on the basis of the change pattern of the resistance. An example of this type is disclosed in Japanese Laid-open Patent Application No. Sho 57-127584. Furthermore, another method has been developed wherein the voltage across the electrode tips is with a preset reference voltage changing with time, and welding control is carried out depending on whether the difference therebetween is within an allowable value or not. An example of this type is disclosed in Japanese Patent Publication No. Sho 59-40551. Moreover, in accordance with the progress of the recent computer and simulation technologies, other methods have been developed and used practically wherein a thermal conduction model is used, and nugget diameters are calculated by using a computer. In these methods, the temperature distribution of a base metal is calculated from a thermal conduction model, nugget formation conditions are estimated from the temperature distribution, and welding control is carried out depending on the conditions. An example of this type is disclosed in Japanese Laid-open Patent Application No. Hei 9-216072. In addition, still another method has been developed wherein the temperature distribution of the base metal is calculated from a thermal conduction model, the nugget diameter is estimated from the temperature distribution, and the temperature distribution is corrected by using the movement amount of the electrodes during welding. An example of this type is disclosed in Japanese Laid-open Patent Application No. Hei 7-16791.

Among these technologies, in the cases of the conventional various welding control methods not using any thermal conduction models, it is necessary to carry out preliminary experiments for each welding material at a welding site to obtain the relationship between the quality of welding and its criterion. The result of the control is unsatisfactory. This disadvantage in the conventional welding control methods is caused by the fact that the control algorithm thereof is created on the basis of only the basic images and experimental equations.

Furthermore, the recent welding control methods using a thermal conduction model have a possibility of solving the above-mentioned problems since general-purpose control methods are incorporated. However, the actual welding conditions at a welding site depend on the mixture of various sheet combinations (the combinations of sheets being different in thickness, material and surface treatment), the presence or absence of welded points, the presence or absence of end point welding (welding to a sheet end portion), and the difference in shape between the electrode tips, and the like. Therefore, in some cases, it has been difficult to raise the accuracy of control and to obtain high welding quality by using only the thermal conduction model.

For example, when a sheet combination is formed of thin and thick sheets, and when three or more sheets are overlaid and welded, even if it is estimated that melted portions are sufficiently obtained by using the thermal conduction model depending on the contact interface positions of thin and thick sheets, it is difficult to judge whether the portion of the thin sheet making contact with the welding electrode functioning as a cooling end has melted or not.

Accordingly, the present invention is intended to provide a resistance welding machine control method capable of improving control accuracy and welding quality.

SUMMARY OF THE INVENTION

A resistance welding machine control method in accordance with the present invention is a method for calculating a temperature distribution at a portion to be welded by using changes in welding current and voltage across two welding electrodes during welding and information on sheet combination sequence at a spot-welding position, and for controlling at least the welding current or pressure applied to the electrodes by using the calculated temperature distribution.

In accordance with the resistance welding machine control method of the present invention, the temperature distribution at the portion to be welded is calculated by using changes in welding current and voltage across the two welding electrodes during welding and the information on sheet combination sequence at the spot-welding position. For this reason, it is possible to calculate the temperature distribution accurately. Since this temperature distribution is used to control the welding current and/or the pressure applied to the electrodes, this method is effective in accomplishing highly accurate nugget dimension characteristic values at the portion to be welded, thereby accomplishing the control of welding quality.

Furthermore, a resistance welding machine control method in accordance with the present invention is a method for calculating a temperature distribution at a portion to be welded by using changes in welding current and voltage across two welding electrodes during welding and welding position information at a spot-welding position, and for controlling at least the welding current or pressure applied to the electrodes by using the calculated temperature distribution.

In accordance with the resistance welding machine control method of the present invention, the temperature distribution at the portion to be welded is calculated by using changes in welding current and voltage across the two welding electrodes during welding and the welding position information at the spot-welding position, and the welding current and/or the pressure applied to the electrodes are controlled by using the calculated temperature distribution. For this reason, welding quality is less affected by the spot welding position. As a result, this method is effective in accomplishing highly accurate nugget dimension characteristic values at the portion to be welded, thereby accomplishing the control of welding quality.

Furthermore, a resistance welding machine control method in accordance with the present invention is a method for calculating a temperature distribution at a portion to be welded by using changes in welding current and voltage across two welding electrodes during welding, and information on the comparison of wear between the two welding electrodes, and for controlling at least the welding current or pressure applied to the electrodes by using the calculated temperature distribution.

In accordance with the resistance welding machine control method of the present invention, the temperature distribution at the portion to be welded is calculated by using changes in welding current and voltage across the two welding electrodes during welding and the information on the comparison of wear between the two welding electrodes, and the welding current and/or the pressure applied to the electrodes are controlled by using the calculated temperature distribution. For this reason, welding quality is less affected when the condition of wear differs between the two welding electrodes, and when the diameter of the electrode tip differs between the two welding electrodes. As a result, this method is effective in accomplishing highly accurate nugget dimension characteristic values at the portion to be welded, thereby accomplishing the control of welding quality.

Furthermore, a resistance welding machine control method in accordance with the present invention is a method for calculating a temperature distribution at a portion to be welded by using changes in welding current and voltage across two welding electrodes during welding, and information on sheet combination sequence and welding position information at a spot-welding position, and for controlling at least the welding current or pressure applied to the electrodes by using the calculated temperature distribution.

Furthermore, a resistance welding machine control method in accordance with the present invention is a method for calculating a temperature distribution at a portion to be welded by using changes in welding current and voltage across two welding electrodes during welding, information on sheet combination sequence and welding position information at a spot-welding position, and information on the comparison of wear between the two welding electrodes, and for controlling at least the welding current or pressure applied to the electrodes by using the calculated temperature distribution.

Furthermore, a resistance welding machine control method in accordance with the present invention is a method for calculating a temperature distribution at a portion to be welded by using changes in welding current and voltage across two welding electrodes during welding, information on sheet combination sequence at a spot-welding position and information on the comparison of wear between the two welding electrodes, and for controlling at least the welding current or pressure applied to the electrodes by using the calculated temperature distribution.

Furthermore, a resistance welding machine control method in accordance with the present invention is a method for calculating the temperature distribution at a portion to be welded by using changes in welding current and voltage across two welding electrodes during welding, welding position information at a spot-welding position and information on the comparison of wear between the two welding electrodes, and for controlling at least the welding current or pressure applied to the electrodes by using the calculated temperature distribution.

In the above-mentioned resistance welding machine control method in accordance with the present invention, the sheet combination sequence at the spot-welding position includes information on the overlaying sequence of sheets constituting a sheet combination to be welded.

In the above-mentioned resistance welding machine control method in accordance with the present invention, the sheet combination sequence at the spot-welding position includes information on the materials of sheets constituting a sheet combination to be welded.

In the above-mentioned resistance welding machine control method in accordance with the present invention, the sheet combination sequence at the spot-welding position includes information on the surface treatment of sheets constituting a sheet combination to be welded.

In the above-mentioned resistance welding machine control method in accordance with the present invention, the welding position information at the spot-welding position includes information on the distance to a welded point.

In the above-mentioned resistance welding machine control method in accordance with the present invention, the welding position information at the spot-welding position includes information on the distance to the end points of a workpiece.

In the above-mentioned resistance welding machine-control method in accordance with the present invention, the information on the comparison of wear between the two welding electrodes includes information on the comparison of the contact diameters at the tips of the welding electrodes.

In the above-mentioned resistance welding machine control method in accordance with the present invention, the information on the comparison of wear between the two welding electrodes includes information on the shapes of the tips of the welding electrodes.

BRIEF DESCRIPTION OF THE DRAWINGS

FIGS. 3a and 3b are views showing welding conditions depending on sheet combination sequence in the case when one of the welding electrodes is worn;

FIGS. 5a and 5b are views showing welding conditions wherein a welded point is present and a shunt occurs;

DETAILED DESCRIPTION OF THE INVENTION

An embodiment in accordance with the present invention will be described below referring to FIGS. 1 to 7.

Figure 1:
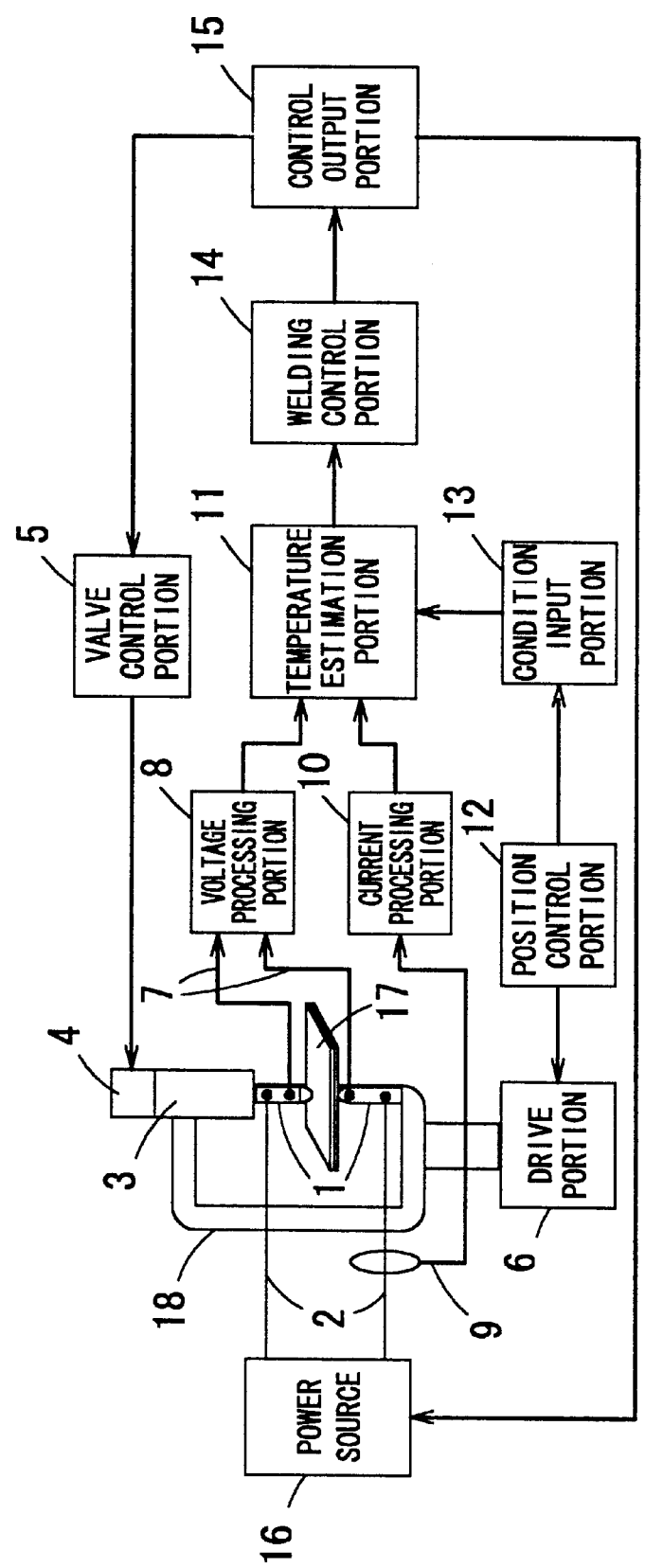
FIG. 1 is a view showing an example of a resistance welding machine control method in accordance with an embodiment of the present invention.

Referring to FIG. 1, pressure is applied to welding electrodes 1 by a pressure cylinder 3 so as to hold a workpiece 17 therebetween. The welding electrodes 1 are connected to a welding power source 16 via secondary conductors 2. A mechanism portion 18 has a movement mechanism electrically insulated from the welding electrodes 1, and is driven by a drive portion 6 to move the welding electrodes 1 to any positions on the workpiece 17 in accordance with commands from a spot-welding position control portion 12.

Voltage detection lines 7 are connected to the welding electrodes 1, and a welding voltage is detected by a welding voltage signal processing portion 8. At the same time, the signal of a welding current detection portion 9 is processed by a welding current processing portion 10, and input to a weld portion temperature estimation portion 11.

Furthermore, the spot-welding position of the workpiece 17, the sheet overlaying sequence at the spot-welding position, spot-welding position information, and information on the comparison of wear between the two welding electrodes have been input beforehand to the spot-welding position control portion 12. The spot-welding position control portion 12 moves the welding electrodes 1 to the spot-welding position and transmits the movement information to a welding condition input portion 13.

By using the signals of the welding voltage signal processing portion 8 and the welding current detection portion 9, the weld portion temperature estimation portion 11 estimates the temperature inside the welded portion of the workpiece 17. By using the result of the estimation, a welding control portion 14 generates a control amount. A control output portion 15 transmits a control output to an electropneumatic proportion valve 4 via the welding power source 16 and an electropneumatic proportion valve control portion 5, whereby welding conditions are controlled, and at least one of the welding current and the welding pressure is controlled.

The operation of the weld portion temperature estimation portion 11 is described below. The thickness of the workpiece 17 to be welded, the number of overlaid sheets thereof, the materials of the sheets, the physical constants depending on the materials of the sheets, the shape and type of the electrodes, and the physical constants depending on the material of the electrodes have been input beforehand into the weld portion temperature estimation portion 11. The weld portion temperature estimation portion 11 sets the boundary conditions of a thermal conduction model on the basis of the given numerical values. This thermal conduction model is formed of the geometric shape and physical constants of a portion to be welded, and is a mathematical model for numerical analysis on the basis of the voltage and welding current at the portion to be welded. Numerical analysis is carried out by using the thermal conduction model on the basis of the welding current flowing through the portion to be welded and the voltage applied thereto to calculate the current-carrying diameter used as a current-carrying passage, potential distribution and current density distribution at the portion to be welded. The amount of heating and thermal conduction are then calculated on the basis of the current density and inherent resistance at each portion to be welded, whereby the temperature distribution of the portions to be welded can be estimated. This estimation is used to control the quality of welding (nugget dimension characteristic values) at the portion to be welded. An example similar to this operation of the weld portion temperature estimation portion 11 is detailed in Japanese Patent Publication Hei 7-16791.

However, in actual welding sites, sheets having various thickness values are mixed, "three or more sheets are overlaid," "end-point welding occurs frequently," "shunt welding also occurs frequently," "electrodes being different from each other in shape are used as a pair in some cases," and other difficult situations are encountered. Therefore, when only the information on the thickness of the workpiece, the number of the overlaid sheets thereof and the materials of the sheets is used, it is difficult to control the nugget dimension characteristic values at the portion to be welded, in some cases.

Figure 2:
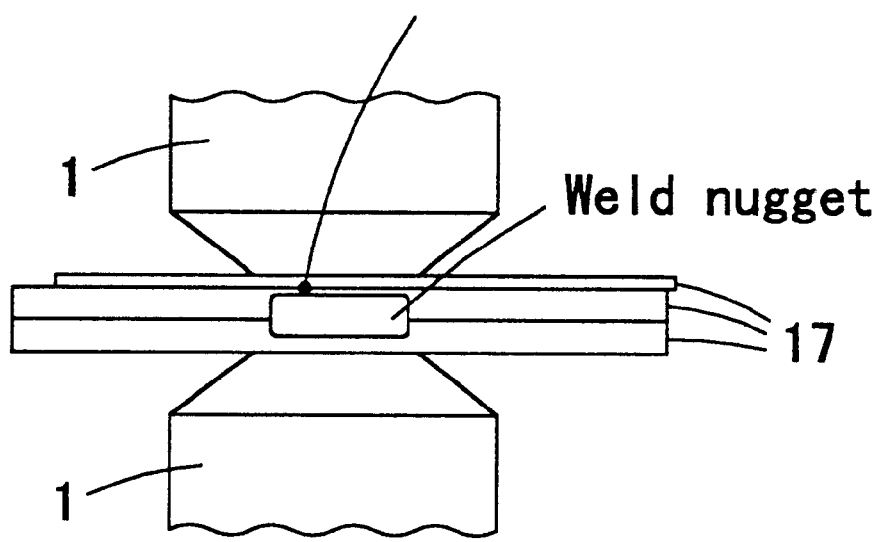
FIG. 2 is a view showing a sheet combination to be welded, comprising sheets having differences in thickness.

FIG. 2 shows an example wherein the workpiece 17 is formed of mixed thin and thick sheets, and the sheets have significant differences in thickness, whereby weld defects occur, making the control of the quality of welding difficult.

In addition, the wear condition of one of the welding electrodes 1 may be significantly different from that of the other in some cases, and nuggets may generate at different positions. Even when the same sheet combination is used, it becomes difficult to control the nugget dimension characteristic values, unless the sheet overlaying sequence is considered with respect to the electrodes. Furthermore, in some cases, the electrode tips are formed in special shapes depending on portions to be welded. Examples of this case are shown in FIGS. 3a and 3b.

Figure 4:
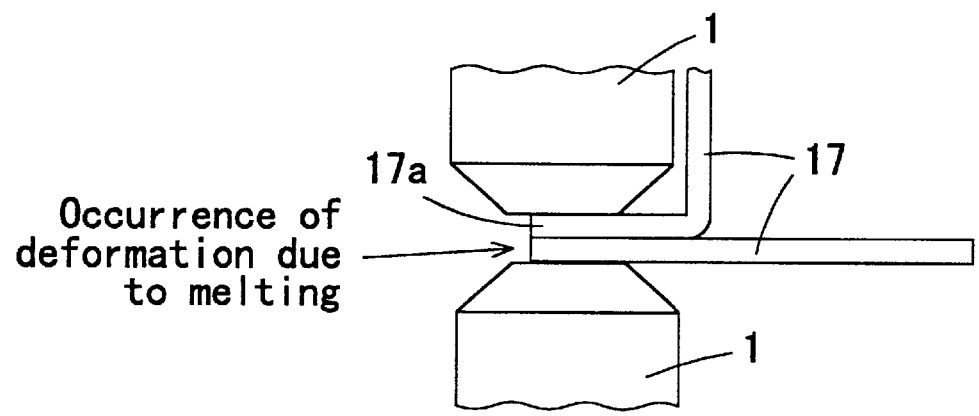
FIG. 4 is a view showing an example of welding at an end point of a workpiece.

Moreover, in the case when a spot-welding position is an end point, or when a shunt occurs significantly, it may be difficult to apply the thermal conduction model itself in some cases. FIG. 4 shows an example wherein welding is carried out at an end point 17a of the workpiece 17. FIG. 5 shows an example wherein the spot-welding position is away from a welded point 21 by distance H, and a shunt 20 to the welded point 21 occurs.

In the present embodiment, the information on the sheet overlaying sequence and the welding position information at the spot-welding positions of the workpiece 17, and the information on the comparison of wear between the two welding electrodes have been input beforehand from the spot-welding position control portion 12 to the welding condition input portion 13, in accordance with the contents indicated in TABLE 1.

Thickness values, materials and overlaying sequence for up to four sheets can be written in TABLE 1. In addition, it is possible to input disturbance conditions at the spot-welding positions, i.e., the level of end point welding and the level of shunt occurrence. Furthermore, it is also possible to input the information on the comparison between the two welding electrodes, i.e., the difference between the diameters of the electrode tips, and the like.

TABLE 1

<An example of a welding condition transmission table>
Welding condition transmission table

| Item | Setting range | Remarks |
| --- | --- | --- |
| Applied pressure | 00~80 | 0.0~8.0 kgf |
| Initial pressure application time | 00~99 | Cycle |
| Welding time | 00~99 | Cycle (Note 1) |
| Welding current | 00~99 | Cycle (Note 1) |
| Sheet thickness 1 | 1~U | 0 (0.0 mm)~9 (0.9 mm)~ A(1.0 mm)~U(3.0 mm) |
| Material 1 | 1~5 | 1 → bare steel sheet, 2 → galvanized steel sheet, 3 to 5 → high-tensile steel sheets classified depending on the type thereof |
| Sheet thickness 2 | 1~U | Identical to the remarks for sheet thickness 1. |
| Material 2 | 1~5 | Identical to the remarks for material 1. |
| Sheet thickness 3 | 1~U | Identical to the remarks for sheet thickness 1. |

TABLE 1-continued

<An example of a welding condition transmission table>
Welding condition transmission table

| Item | Setting range | Remarks |
|---|---|---|
| Material 3 | 1~5 | Identical to the remarks for material 1. |
| Sheet thickness 4 | 1~U | Identical to the remarks for sheet thickness 1. |
| Material 4 | 1~5 | Identical to the remarks for material 1. |
| Holding time | 00~99 | Cycle |
| Distance to end point | 50~99 | 5.0 to 9.9 mm (ordinary welding in the case of 9.9 mm or more) |
| Shunt level | 0~5 | 0 → no shunt, 5 → distance of 5 mm or less |
| Electrode wear level | 1~9 | 5 → no difference, small head-side wear level: up to 4, large head-side wear level: up to 9 |
| Difference in shape between electrode tips | 1~9 | 5 → No difference, small head-side shape level: up to 4, large head-side shape level: up to 9 |

(Note 1) When the distance to the end point is 50, and the shunt level is 5, constant-current welding is carried out at these welding conditions.

Besides, the welding conditions of a welding method changed depending on disturbance conditions have also been set. In TABLE 1, a cycle represents an alternating current period. One cycle is about 16 ms (1 period) in 60 Hz regions, and represents an alternating current carrying time. 1 to U represent thickness values indicated by numerical and alphabet characters so that values up to 3 mm can be indicated by a signal character. The distance to an end point in the range of 55 to 99 represents the distance between the center of the welding tip and an end portion in the range of 5 mm to 9.9 mm. The level of shunt is judged depending on the distance between a spot-welding position to a nearby welded point. Level 0 represents that no shunt occurs, and level 5 represents that the distance is 5 mm or less. Furthermore, the state of surface treatment is classified depending on the "material." For example, 1 represents a bare steel sheet, 2 represents a galvanized steel sheet, 3 represents a bare high-tensile steel sheet, 4 represents a galvanized high-tensile steel sheet, and the like.

On the basis of the information, the weld portion temperature estimation portion 11 makes a judgment to determine an interface being apt to cause weld defects, depending on the sheet overlaying sequence and the materials of sheets having various thickness values. The nugget dimension characteristic values are controlled depending on the temperature distribution at the interface.

In other words, when the sheet overlaying sequence at the spot-welding position indicated in TABLE 1 is input, the weld portion temperature estimation portion 11 makes a judgment to determine whether it is necessary to correct the numerical analysis method for the thermal conduction model.

In the present embodiment, the judgment is made by using the ratio of the thickness of the sheet making contact with one of the electrodes used as a cooling end 1a having a temperature of T=Tr and the total thickness of the other sheets. In the case when this ratio is small, that is, when the sheet making contact with the electrode 1 is a thin sheet, and its thickness is far smaller than the total thickness of the other sheets, a corrected numerical calculation is carried out.

Figure 6:
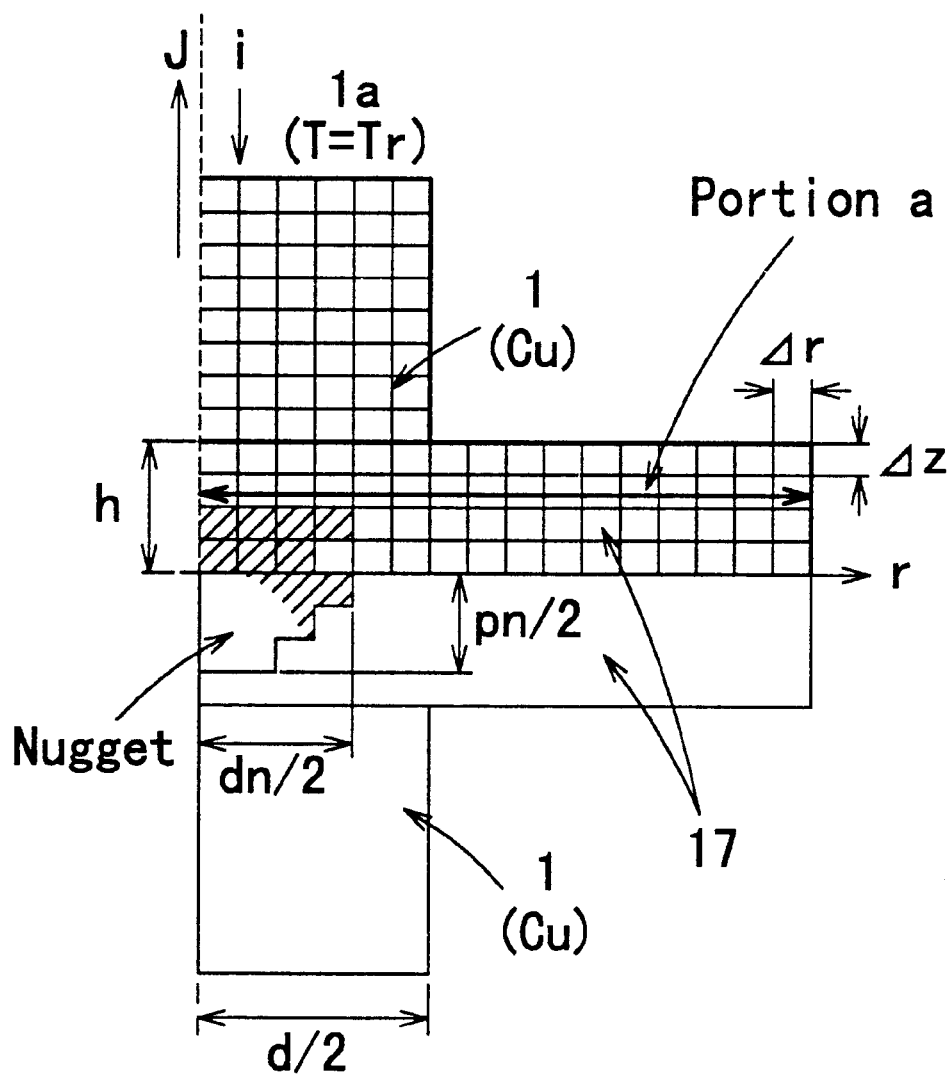
FIG. 6 is a view showing a correction method in the case when a thermal conduction model is used, and sheets have large differences in thickness.

FIG. 6 is a schematic view showing the numerical analysis method conducted in this case. It also indicates a thermal conduction model that is assumed to be symmetrical with respect to the center axis of the electrode having a radius of d/2 at the portion to be welded and also symmetrical with respect to the center axis of the workpiece 17 in the direction of the total thickness thereof. In actual numerical calculation, the upper right portion of FIG. 6, i.e., a quarter of the model, is used for calculation because of limitations in calculation time. J represents the center axis of the electrode, and i represents welding current.

FIG. 6 shows this portion being divided into calculation grids. The grid intervals are $\Delta r \times \Delta z$, and the half of the thickness of the workpiece 17 is h. In addition, the portion below the axis r in the figure indicates a solid portion and a melted portion for the explanation of the result of the numerical analysis. In this case, the radius of the melted portion (the radius of a nugget) is dn/2, and the half of the thickness of the portion to be welded is pn/2. The numerical calculation in accordance with the actual embodiment is carried out with $\Delta r \times \Delta z$ being set at about 0.1 mm.

The correction method in the case when the sheets constituting the workpiece 17 have significant differences in thickness is described below. After the temperature distribution inside the portion to be welded is calculated as shown in the figure, the temperature distribution at portion a of FIG. 6 corresponding to the interface between the sheet making contact with the electrode and the other sheets is examined. A welding condition change command is issued to the welding control portion 14 so that the temperature at the portion reaches the melting temperature within the welding time, and then the welding conditions are changed.

In this case, the pressure applied to the electrodes may be controlled by controlling the electropneumatic proportion control valve 5. Furthermore, the wear progress states of the two electrodes or the comparison of the shapes of the electrode tips is known beforehand. The correction is carried out in the case when a thin sheet makes contact with a significantly worn electrode, i.e., an electrode having a large tip. In this case, the interface condition between the electrode and the sheet for the numerical calculation is changed to the interface condition for the electrode having a large tip, and the then temperature distribution is obtained.

Furthermore, since the states of the end point and the shunt are input from the spot-welding position information, the level of the end point welding and the distance to the welded point 21 are known beforehand. Correction is carried out depending on the states, and the temperature distribution at the portion to be welded is estimated.

In the case of end point welding shown in FIG. 4, the workpiece 17 deforms significantly during welding, and the total thickness of the sheets constituting the workpiece 17 changes significantly. Therefore, a sheet thickness correction coefficient is prepared depending on the level of the end point welding, and used for sheet thickness correction. In the case when the distance H to the welded point 21 is small as shown in FIG. 5, a shunt ratio depending on the distance is prepared and used to correct welding current. After this correction, the temperature distribution at the portion to be welded is obtained, and then the welding conditions are changed.

Figure 7:
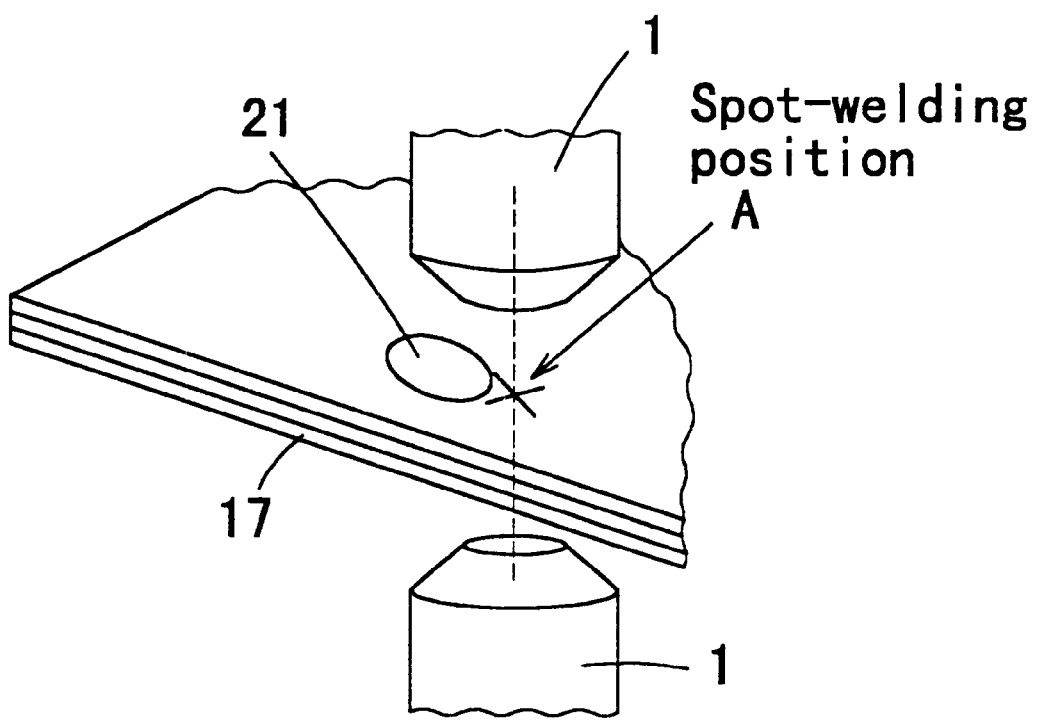
FIG. 7 is a view showing an welding condition in the case when a welded point is close to a spot-welding position.

Moreover, in the case of point A of FIG. 7, wherein the distance to the welded point 21 is very small, whereby it is assumed that nuggets overlap and it is also assumed to be difficult to use the thermal conductivity model, constant current welding is selected, and welding is carried out on the welding conditions set in TABLE 1, thereby preventing excessive input to the electrodes and the workpiece.

In accordance with the present embodiment of the present invention, it is possible to know the sheet combination information at the spot-welding position, that is, the thickness values, materials, surface treatment states and overlaying sequence of the sheets constituting the workpiece. Therefore, when the temperature distribution of the portion to be welded is estimated depending on the changes in the welding current and the voltage across the two welding electrodes during welding, the melting state of the sheet making contact with the welding electrode can also be estimated from the temperature distribution of the portion to be welded. In addition, by obtaining the welding position information, the shut ratio of the welding current can be corrected, or the correction at the time of end point welding can be carried out. Furthermore, when the temperature distribution is estimated from the information on the comparison of wear between the two welding electrodes, the interface condition can also be corrected, whereby welding control can be accomplished at higher accuracy.

As described above, by using the welding current, the voltage across the electrodes, the sheet overlaying sequence at the spot-welding position, the spot-welding position information at the spot-welding position and the information on the comparison of wear between the two welding electrodes, the temperature distribution at the portions to be welded can be calculated from the changes in the welding current and the voltage across the electrodes during welding. By using the calculated temperature distribution, the welding current and/or the pressure to the electrodes can be controlled. In addition, the spot-welding position information at the spot-welding position can also be used. As a result, it is possible to control the nugget dimension characteristic values accurately.

However, the present invention is not limited to the present embodiment at all, and various modifications may be made without departing from the spirit and scope of the present invention. Furthermore, although the thermal conduction model in accordance of the present embodiment is a simplified one-dimensional model wherein the portion to be welded is symmetrical in the vertical and lateral directions, it is needless to say that the thermal conduction model is applicable to non-symmetrical and three-dimensional models being closer to actual welding conditions.

What is claimed is:

1. A method for controlling a resistance welding machine, comprising the steps of:
   (a) calculating a temperature distribution, at a portion to be welded, of a workpiece comprising a combination of sheets overlaid in a sequence and disposed between opposed welding electrodes, said welding electrodes having a pressure applied thereto to hold said workpiece therebetween during a welding operation, wherein said calculating of said temperature distribution employs information relating to (i) changes in welding current and welding voltage across the welding electrodes and (ii) said sequence of said sheets; and
   (b) controlling, based on said temperature distribution, at least one of said welding current and said pressure.

2. A method for controlling a resistance welding machine, comprising the steps of:
   (a) calculating a temperature distribution, at a spot-welding position, of a workpiece comprising a combination of sheets overlaid in a sequence and disposed between opposed welding electrodes, said welding electrodes having a pressure applied thereto to hold said workpiece therebetween during a welding operation, wherein said calculating of said temperature distribution employs information relating to (i) changes in welding current and voltage across the welding electrodes and (ii) said spot-welding position; and
   (b) controlling, based on said temperature distribution, at least one of said welding current and said pressure.

3. A method for controlling a resistance welding machine, comprising the steps of:
   (a) calculating a temperature distribution, at a portion to be welded, of a workpiece comprising a combination of sheets overlaid in a sequence and disposed between opposed welding electrodes, said welding electrodes having a pressure applied thereto to hold said workpiece therebetween during a welding operation, wherein said calculating of said temperature distribution employs information relating to (i) changes in welding current and welding voltage across the welding electrodes and (ii) the wear of said electrodes in comparison to each other; and
   (b) controlling, based on said temperature distribution, at least one of said welding current and said pressure.

4. A method for controlling a resistance welding machine, comprising the steps of:
   (a) calculating a temperature distribution, at a spot-welding position, of a workpiece comprising a combination of sheets overlaid in a sequence and disposed between opposed welding electrodes, said welding electrodes having a pressure applied thereto to hold said workpiece therebetween during a welding operation, wherein said calculating of said temperature distribution employs information relating to (i) changes in welding current and voltage across the welding electrodes, (ii) said sequence of said sheets, and (iii) said spot-welding position; and
   (b) controlling, based on said temperature distribution, at least one of said welding current and said pressure.

5. A method for controlling a resistance welding machine, comprising the steps of:
   (a) calculating a temperature distribution, at a spot-welding position, of a workpiece comprising a combination of sheets overlaid in a sequence and disposed between opposed welding electrodes, said welding electrodes having a pressure applied thereto to hold said workpiece therebetween during a welding operation, wherein said calculating of said temperature distribution employs information relating to (i) changes in welding current and voltage across the welding electrodes, (ii) said sequence of said sheets, (iii) the wear of said electrodes in comparison to each other, and (iv) said spot-welding position; and
   (b) controlling, based on said temperature distribution, at least one of said welding current and said pressure.

6. A method for controlling a resistance welding machine, comprising the steps of:
   (a) calculating a temperature distribution, at a portion to be welded, of a workpiece comprising a combination of sheets overlaid in a sequence and disposed between opposed welding electrodes, said welding electrodes having a pressure applied thereto to hold said workpiece therebetween during a welding operation, wherein said calculating of said temperature distribution employs information relating to (i) changes in welding current and voltage across the welding electrodes, (ii) said sequence of said sheets, and (iii) the wear of said electrodes in comparison to each other; and
   (b) controlling, based on said temperature distribution, at least one of said welding current and said pressure.

7. A method for controlling a resistance welding machine, comprising the steps of:
   (a) calculating a temperature distribution, at a spot-welding position, of a workpiece comprising a combination of sheets overlaid in a sequence and disposed between opposed welding electrodes, wherein said welding electrodes having a pressure applied thereto to hold said workpiece therebetween during a welding operation, said calculating of said temperature distribution employs information relating to (i) changes in welding current and voltage across the welding electrodes, (ii) the wear of said electrodes in comparison to each other, and (iii) said spot-welding position; and
   (b) controlling, based on said temperature distribution, at least one of said welding current and said pressure.

8. A method in accordance with one of claims 1 and 6, wherein said calculating further employs information relating to materials of which said sheets are made at said portion to be welded.

9. A method in accordance with one of claims 4 and 5, wherein said calculating further employs information relating to materials of which said sheets are made at said spot-welding position.

10. A method in accordance with one of claims 1, 4, 5 and 6, wherein said calculating further employs information relating to the surface treatment of said sheets.

11. A method in accordance with one of claims 2, 4, 5 and 7, wherein said information relating to said spot-welding position includes information relating to a distance to a welded point.

12. A method in accordance with one of claims 2, 4, 5 and 7, wherein said information relating to said spot-welding position includes information relating to a distance to an end point of the workpiece.

13. A method in accordance with one of claims 3, 5, 6 and 7, wherein said information relating to said wear of said welding electrodes includes information relating to a comparison of the contact diameters at the tips of said welding electrodes.

14. A method in accordance with one of claim 3, 5, 6 and 7, wherein said information relating to said wear of said welding electrodes includes information relating to a comparison of the shapes of the tips of said welding electrodes.

* * * * *